(12) United States Patent
Toyohira et al.

(10) Patent No.: US 8,757,734 B2
(45) Date of Patent: Jun. 24, 2014

(54) PEDAL SIMULATOR

(75) Inventors: Tomoya Toyohira, Utsunomiya (JP); William Allan Johnstone, Devizes (GB)

(73) Assignee: Honda Motor Co., Ltd., Tokyo (JP)

( * ) Notice: Subject to any disclaimer, the term of this patent is extended or adjusted under 35 U.S.C. 154(b) by 96 days.

(21) Appl. No.: 13/349,055

(22) Filed: Jan. 12, 2012

(65) Prior Publication Data
US 2012/0103452 A1 May 3, 2012

Related U.S. Application Data

(63) Continuation of application No. 12/075,301, filed on Mar. 10, 2008, now abandoned.

(30) Foreign Application Priority Data

Mar. 13, 2007 (JP) ................................. 2007-063057

(51) Int. Cl.
*B60T 8/34* (2006.01)
(52) U.S. Cl.
USPC .................................... 303/113.4; 303/119.3
(58) Field of Classification Search
USPC ............... 303/113.4, 114.1, 115.1, 115.2, 15, 303/119.2, 119.3
See application file for complete search history.

(56) References Cited

U.S. PATENT DOCUMENTS

| 3,107,905 A | 10/1963 | Lucas |
| 3,682,466 A | 8/1972 | Huchette et al. |
| 5,187,371 A | 2/1993 | Matsui et al. |
| 6,251,493 B1 | 6/2001 | Johnson et al. |
| 6,672,685 B2 * | 1/2004 | Ishimura et al. ........... 303/113.4 |
| 2005/0001476 A1 * | 1/2005 | Kusano ....................... 303/113.4 |
| 2007/0018498 A1 | 1/2007 | Nakazawa |
| 2007/0138720 A1 | 6/2007 | Evans |
| 2008/0258546 A1 * | 10/2008 | Drumm et al. .............. 303/115.4 |
| 2012/0007419 A1 * | 1/2012 | Sellinger et al. ................. 303/15 |

FOREIGN PATENT DOCUMENTS

| JP | 4-004548 A | 1/1992 |
| JP | 6-211124 A | 8/1994 |
| JP | 08-188143 A | 7/1996 |
| JP | 2000-509468 A | 7/2000 |

(Continued)

OTHER PUBLICATIONS

Japanese Office Action dated Jun. 4, 2013, issued over the Japanese Patent Application No. 2012-11533, which is a divisional application of the corresponding Japanese Patent Application No. 2007-063057, with the English translation of pertinent portion.

*Primary Examiner* — Pamela Rodriguez
(74) *Attorney, Agent, or Firm* — Carrier Blackman & Associates, P.C.; William D. Blackman; Joseph P. Carrier (57) ABSTRACT

A pedal simulator includes a cylinder mechanism for absorbing a fluid pressure generated in a pressurization chamber of a master cylinder by operating a brake pedal. The cylinder mechanism includes a housing, a piston slidably held in the housing and defining a fluid chamber for introducing a working fluid thereinto, and a plurality of spring members for urging the piston toward the fluid chamber. The housing includes an open end on an opposite side of the housing from the piston, and a lid member which covers the open end. The lid member is composed of a member separate and distinct from the housing. The lid member is provided with a damper made of a rubber member.

14 Claims, 9 Drawing Sheets

(56) References Cited

FOREIGN PATENT DOCUMENTS

| | | | |
|---|---|---|---|
| JP | 2002-122170 A | 4/2002 |
| JP | 2003-056513 A | 2/2003 |
| JP | 2004-330966 A | 11/2004 |
| JP | 2006-131224 A | 5/2006 |

* cited by examiner

PEDAL SIMULATOR

CROSS-REFERENCE TO RELATED APPLICATIONS

This application is a continuation of application Ser. No. 12/075,301, filed 10 Mar. 2008, which claims priority from Japanese Patent Application number 2007-063057 filed 13 Mar. 2007. The entire content of each of the priority applications is incorporated herein by reference.

BACKGROUND OF THE INVENTION

1. Field of the Invention

The present invention relates to a pedal simulator as a cylinder mechanism including a plurality of disc springs for normally urging a piston toward a fluid chamber for introducing a working fluid thereinto, the fluid chamber being defined partly by the piston, and also including a housing in which the piston is slidably held, wherein the housing has an open end on an opposite side of the housing from the piston and a lid member which covers the open end and is separate and distinct from the housing.

2. Description of the Related Art

In recent years, there has been proposed a brake apparatus for electrically actuating a motor cylinder or a fluid pressure pump to apply a fluid pressure to a braking force generator mounted on a wheel, based on operating information such as of a stepping force on a brake pedal (hereinafter simply referred to as "pedal") which is supplied to a vehicle ECU.

Such a system for electronically controlling brakes with an electric signal, or in other words, a brake-by-wire system, makes it possible to apply braking forces more responsively to the pedal operation and to brake the vehicle more smoothly than the fluid pressure control brake system that has widely been used heretofore which includes a pedal and a master cylinder directly connected to each other.

The brake-by-wire brake apparatus includes a pedal simulator (stroke simulator) for producing a reactive force in response to the depression of the pedal. Owing to the pedal simulator, the depth to which the pedal is depressed (stroke or controlled variable) and the stepping force are related to each other according to certain characteristics (stroke vs. stepping force characteristics).

Japanese Laid-Open Patent Publication No. 06-211124 discloses a cylinder mechanism, serving as such a pedal simulator, which comprises a piston defining a fluid chamber for introducing a working fluid thereinto and a plurality of disc springs for normally urging the piston into the fluid chamber. Based on the characteristics of the disc springs, nonlinear stroke vs. stepping force characteristics are provided to reduce the pedal operating torque (stepping-resistant rigidity) when the pedal starts being depressed and to increase the pedal operating torque as the pedal is progressively depressed, thereby giving the driver a natural operational feeling in operating the pedal.

In the disclosed cylinder mechanism, most of the disc springs are stacked together while facing in the same direction. In order for the piston to slide over a sufficient stroke, the cylinder mechanism needs to have a considerable number of disc springs and hence is costly to manufacture.

Figure 9A:
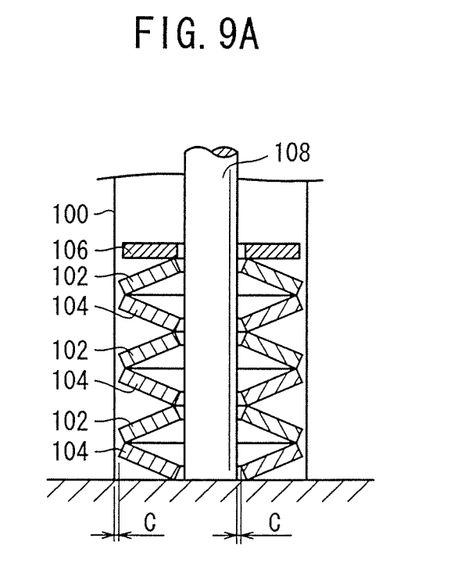
FIG. 9A is a cross-sectional view of a spring assembly according to a comparative example, showing disc springs whose respective bottom ends face each other with no rings interposed.

One solution to reduce the number of disc springs in the cylinder mechanism is shown in FIG. 9A of the accompanying drawings. According to the solution shown in FIG. 9A, the disc springs have respective bottom ends facing together in a housing 100. Specifically, disc springs 102 have upwardly directed conical shapes and disc springs 104 have downwardly directed (reversely directed) conical shapes. The structure shown in FIG. 9A is effective to reduce the number of stacked disc springs and to allow the piston 106 to slide over a sufficient stroke.

Figure 9B:
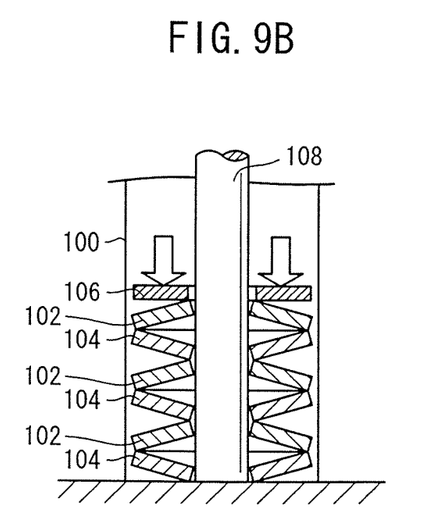
FIG. 9B is a cross-sectional view of the spring assembly of FIG. 9A, showing the disc springs which are compressed from the position shown in FIG. 9A.
Figure 9C:
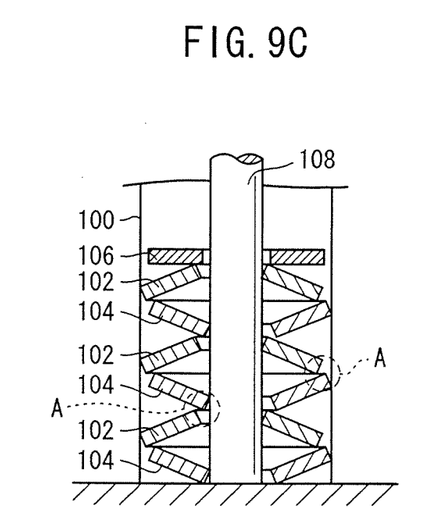
FIG. 9C is a cross-sectional view of the spring assembly of FIGS. 9A-9B, showing the disc springs which are expanded from the position shown in FIG. 9B.

Normally, slight clearances C are required between the disc springs 102, 104 and the housing 100; and also between the disc springs 102, 104 and a shaft 108 around which the disc springs 102, 104 are disposed, in view of the flexure of the disc springs 102, 104, as shown in FIG. 9A. As shown in FIG. 9B of the accompanying drawings, when a piston 106 on the disc springs 102, 104 is pushed, the disc springs 102, 104 are compressed. Thereafter, as shown in FIG. 9C, when the piston 106 is retracted and the disc springs 102, 104 are expanded, the disc springs 102, 104 may possibly be diametrically displaced across the clearances C, as indicated by A in FIG. 9C of the accompanying drawings.

If the disc springs 102, 104 are displaced as indicated by A, then the disc springs 102, 104 tend to suffer irregular sliding resistance each time they are expanded and compressed. Therefore, the stroke vs. stepping force characteristics undergo complex changes each time the disc springs 102, 104 are compressed, and become unstable. The simple face-to-face placement of the disc springs 102, 104 makes it difficult to manage or hold them in a stable stacked state, and results in change in the spring characteristics of the disc springs 102, 104 each time they are expanded and compressed. The changing spring characteristics cause unwanted differences between individual cylinder mechanisms.

SUMMARY OF THE INVENTION

It is a general object of the present invention to provide a cylinder mechanism which employs a reduced number of disc springs for urging a piston toward a fluid chamber which is defined partly by the piston for introducing a working fluid thereinto.

A major object of the present invention is to provide a cylinder mechanism which has stable spring characteristics.

According to an aspect of the present invention, there is provided a cylinder mechanism comprising a housing, a piston slidably held in the housing for defining a fluid chamber for introducing a working fluid thereinto, a plurality of disc springs for urging the piston toward the fluid chamber, at least two of the disc springs having respective bottom ends facing each other, and a circular member having an arcuate surface held against respective inner surfaces of the at least two of the disc springs. There are also provided a pedal simulator comprising such a cylinder mechanism for absorbing a fluid pressure generated in a pressurization chamber of a master cylinder by operating a brake pedal, and a brake apparatus comprising such a pedal simulator and a braking force generator for generating a braking force based on the fluid pressure generated by at least the master cylinder.

According to another aspect of the present invention, there is also provided a cylinder mechanism comprising a housing, a piston slidably held in the housing and defining a fluid chamber for introducing a working fluid thereinto, a plurality of disc springs for urging the piston toward the fluid chamber, at least two of the disc springs having respective bottom ends facing each other, and motion preventing means for preventing the at least two of the disc springs from moving in a direction perpendicular to an axial direction of the disc springs.

Since at least two of the disc springs have respective bottom ends facing each other, and are not oriented in the same direction in their stack, the upper end of one of the disc springs is not embedded in the bottom end of an adjacent one of the disc springs. Therefore, the assembly of the disc springs provides a sufficient stroke with a reduced number of disc springs. Furthermore, inasmuch as the disc springs with their respective bottom ends facing each other are prevented by the circular member or the motion preventing means from being moved or shifted in a diametrical direction perpendicular to the axial direction of those disc springs, the disc springs are effectively prevented from changing their characteristics each time they are expanded and compressed, and hence provide desired stable spring characteristics. Particularly, if the circular member is used, since the inner surfaces of the disc springs with their respective bottom ends facing each other are held against the outer arcuate circumferential surface of the circular member, the circular member can hold the disc springs concentrically to each other. The disc springs are thus held against each other in the diametrical direction perpendicular to the axial direction, and are effectively prevented from being moved or shifted in the diametrical direction.

If the circular member is movable in the axial direction and is prevented from moving in the diametrical direction perpendicular to the axial direction, the circular member itself is prevented from being moved or shifted in the diametrical direction. If the cylinder mechanism includes a plurality of sets of disc springs with their respective bottom ends facing each other, the sets of the disc springs are effectively prevented from being shifted with respect to each other.

According to the invention there is also provided a pedal simulator including a cylinder mechanism for absorbing a fluid pressure generated in a pressurization chamber of a master cylinder by operating a brake pedal. The cylinder mechanism includes a housing; a piston slidably held in the housing and defining a fluid chamber for introducing a working fluid thereinto; and a plurality of spring members for urging the piston toward the fluid chamber. The housing includes an open end on an opposite side of the housing from the piston; and a lid member which covers the open end and is composed of a member separate and distinct from the housing. The lid member is provided with a damper made of a rubber member.

The present invention is further characterized in that the damper includes a step portion having a width gradually increasing from a piston side toward an open end side in an axial cross-sectional view of the cylinder mechanism.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Cylinder mechanisms according to preferred embodiments of the present invention in combination with a brake apparatus incorporating pedal simulators each as a cylinder mechanism will be described in detail below with reference to the accompanying drawings.

Figure 1:
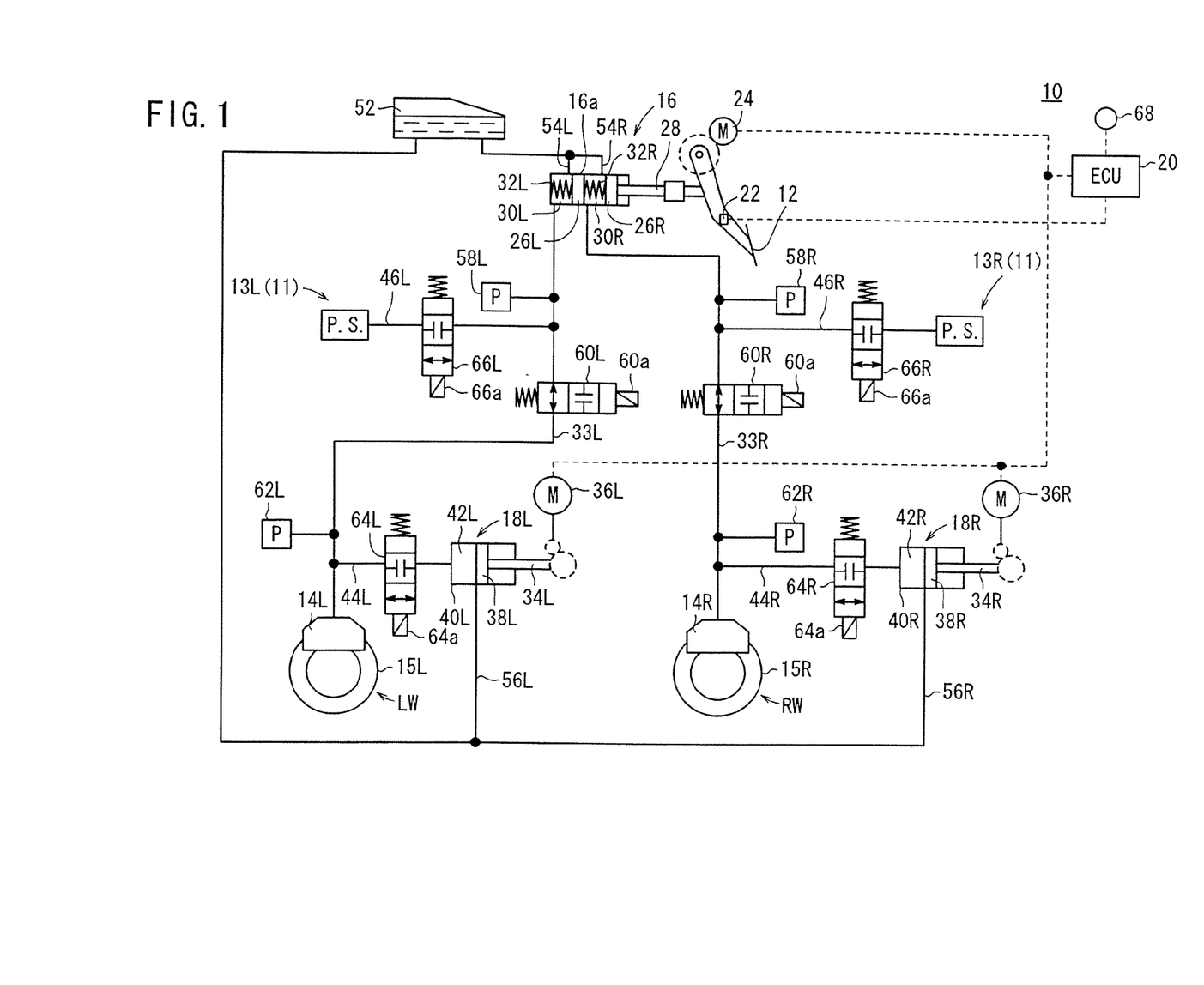
FIG. 1 is a block circuit diagram of a brake apparatus incorporating a pedal simulator as a cylinder mechanism according to an embodiment of the present invention.

First, a brake apparatus of a vehicle incorporating pedal simulators each as a cylinder mechanism according to the present invention will be described below. FIG. 1 is a block circuit diagram of a brake apparatus 10 incorporating pedal simulators 13L, 13R each as a cylinder mechanism 11 according to an embodiment of the present invention.

The brake apparatus 10 is mounted on a vehicle such as an automobile or the like. The brake apparatus 10 includes braking force generators (calipers, wheel cylinders, brake cylinders) 14L, 14R on a left wheel LW and a right wheel RW. In response to the driver's (operator's) operation on a pedal (brake pedal) 12, the braking force generators 14L, 14R grip respective disks 15L, 15R on the wheels LW, RW to generate braking forces to brake the vehicle. In FIG. 1, only the left wheel LW and the right wheel RW are shown as front wheels of the vehicle, and rear wheels are omitted from illustration. However, the brake apparatus 10 includes components, similar to those combined with the front wheels, i.e., the left wheel LW and the right wheel RW, associated with the rear wheels. Those components associated with the left wheel LW are denoted by reference characters with a suffix "L", and those components associated with the right wheel RW are denoted by reference characters with a suffix "R". When the components associated with the left and right wheels RW, LW are collectively referred to, the suffixes "L", "R" are omitted in the description.

The brake apparatus 10 has a pedal 12 which is operated by the driver to brake the vehicle, a master cylinder 16 actuatable in response to the operation of the pedal 12, and motor cylinders (fluid pressure generators, caliper cylinders) 18L, 18R for applying a fluid pressure to cause the braking force generators 14L, 14R to generate braking forces. Some components of the brake apparatus 10 are electrically connected to an ECU 20 as a controller and are controlled by the ECU 20.

Specifically, the brake apparatus 10 comprises a fluid pressure (oil pressure) system interconnecting components in fluid pressure (oil pressure) transmitting relation, and an electric system electrically interconnecting components and the ECU 20. In FIG. 1, the fluid pressure system has passages (fluid passages) indicated by the solid lines and the electric system has passages (signal lines) indicated by the dotted lines. The fluid pressure system is filled up with a fluid such as a brake fluid.

As shown in FIG. 1, the pedal 12 has a pedal operation information detector 22 for detecting a force (stepping force) with which the driver steps on the pedal 12 and a depth (controlled variable, stroke) to which the pedal 12 is depressed by the driver. The pedal operation information detector 22 supplies detected values to the ECU 20. The pedal operation information detector 22 may comprise a torque sensor, for example, mounted on the surface of the pedal 12 for detecting the stepping force, and a potentiometer (rotary potentiometer), for example, for detecting the stroke. The pedal operation information detector 22 may be arranged to detect the stepping force only.

An electric actuator (actuator, reactive force motor) 24 is coupled to a pivot shaft on the proximal end of the pedal 12. The electric actuator 24 serves to adjust a reactive force generated against the depression of the pedal 12 by the driver and also to adjust the position of the pedal 12 under the control of the ECU 20. The electric actuator 24 can apply a torque to the pedal 12, and hence can function as the pedal operation information detector 22 for detecting the stepping force on the pedal 12.

The master cylinder 16 comprises two pistons 26L, 26R disposed axially in tandem in a cylinder 16a, a rod 28 having a rear end coupled to the pedal 12 for moving the pistons 26L, 26R axially back and forth, and two pressurization chambers 30L, 30R defined in the cylinder 16a by the pistons 26L, 26R. The pressurization chambers 30L, 30R house respective return springs (resilient members) 32L, 32R therein for returning the pistons 26L, 26R to their home positions after the pistons 26L, 26R have been moved forward by the pedal 12 depressed by the driver.

The pressurization chambers 30L, 30R are connected respectively to the braking force generators 14L, 14R by main passages 33L, 33R.

The motor cylinders 18L, 18R have respective piston rods 34L, 34R having rear ends connected to respective brake motors (caliper motors) 36L, 36R for moving respective pistons 38L, 38R back and forth in respective cylinders 40L, 40R. The motor cylinders 18L, 18R also have respective pressurization chambers 42L, 42R defined in the cylinders 40L, 40R by the respective pistons 38L, 38R. The pressurization chambers 42L, 42R are connected respectively to the main passages 33L, 33R through passages 44L, 44R. Therefore, the pressurization chambers 42 of the motor cylinders 18 are connected to the braking force generators 14.

The pedal simulators (P.S.) 13L, 13R, each serving as the cylinder mechanism 11 according to the present embodiment, are connected by respective passages 46L, 46R to portions of the main passages 33L, 33R which lie closer to the master cylinder 16 than the passages 44L, 44R.

The pressurization chambers 30L, 30R of the master cylinder 16 are held in fluid communication with respective passages 54L, 54R that are connected to a reservoir tank 52. The reservoir tank 52 has a function to regulate the fluid pressure (fluid amount) in the fluid pressure system of the brake apparatus 10. The reservoir tank 52 is connected to auxiliary passages 56L, 56R that are held in fluid communication with the pressurization chambers 42L, 42R of the motor cylinders 18L, 18R. The passages 54L, 54R and the auxiliary passages 56L, 56R are joined to each other before the passages 54L, 54R and the auxiliary passages 56L, 56R are connected to the reservoir tank 52.

The passages 54 connected to the reservoir tank 52 have open ends held in fluid communication with the pressurization chambers 30 at positions close to the home positions of the pistons 26. When the pistons 26L, 26R are moved even slightly from their home positions, the open ends of the passages 54L, 54R are closed, shutting off the passages 54L, 54R between the pressurization chambers 30L, 30R and the reservoir tank 52. The auxiliary passages 56 are constructed similarly to the passages 54. In other words, when the pistons 38L, 38R are moved even slightly from their home positions, the auxiliary passages 56L, 56R are shut off between the pressurization chambers 42L, 42R and the reservoir tank 52.

To the main passages 33L, 33R, there are respectively connected master cylinder pressure sensors 58L, 58R, fail-safe valves 60L, 60R, and brake pressure sensors (caliper pressure sensors) 62L, 62R which are successively arranged in the order named from the pressurization chambers 30L, 30R. Brake valves (caliper valves) 64L, 64R are connected respectively to the passages 44L, 44R. Simulator valves (PS valves) 66L, 66R are connected respectively to the passages 46L, 46R.

The fail-safe valves 60 are positioned between the joints between the main passages 33 and the passages 44 and the joints between the main passages 33 and the passages 46. The fail-safe valves 60 open or close the main passages 33 when solenoids 60a thereof are energized by the ECU 20. Similarly, the brake valves 64 open or close the passages 44 when solenoids 64a thereof are energized by the ECU 20, and the simulator valves 66 open or close the passages 46 when solenoids 66a thereof are energized by the ECU 20.

For the sake of brevity, signal lines extending from the master cylinder pressure sensors 58 and the brake pressure sensors 62 to the ECU 20 and also signal lines extending from the solenoids 60a, 64a, 66a to the ECU 20 are omitted from illustration in FIG. 1.

In the above-constructed brake apparatus 10, normally, the operation information of the pedal 12 is detected by the pedal operation information detector 22 and supplied to the ECU 20. Based on a command from the ECU 20, the motor cylinders 18 are actuated to cause the braking force generators 14 to generate braking forces, thereby braking the vehicle. The brake apparatus 10 is thus constructed as a system based on the by-wire technology (brake-by-wire system).

When the brake-by-wire system of the brake apparatus 10 is in normal operation, i.e., when the brake-by-wire system is on, the ECU 20 opens the brake valves 64 and the simulator valves 66 and closes the fail-save valves 60.

When the driver operates the pedal 12, a fluid pressure is generated in the pressurization chambers 30 of the master cylinder 16. The fluid pressure is supplied to the pedal simulators 13, each serving as the cylinder mechanism 11, to enable the pedal simulators 13 to generate reactive forces.

At the same time, the operation information (stepping force, stroke) of the pedal 12 is supplied from the pedal operation information detector 22 to the ECU 20, which actuates the motor cylinders 18 based on the operation information. Fluid pressures generated by the motor cylinders 18 are applied to the braking force generators 14, which generate braking forces, thereby braking the left wheel LW and the right wheel RW.

When the brake-by-wire system of the brake apparatus 10 is not in normal operation, i.e., when the brake-by-wire system is off because the ignition switch is turned off, or the brake-by-wire system is defective, for example, the ECU 20 opens the fail-safe valves 60 and closes the brake valves 64 and the simulator valves 66 (see FIG. 1).

When the driver depresses the pedal 12 at this time, the pressurization chambers 30 of the master cylinder 16 develop a fluid pressure which is applied to the braking force generators 14. The braking force generators 14 generate braking forces to brake the left wheel LW and the right wheel WR. At this time, the master cylinder 16 generates and applies a reactive force to the pedal 12.

The brake apparatus 10 allows the initial position of the pedal 12 to be changed. Specifically, when the initial position of the pedal 12 is to be changed, the driver first turns on a position changing switch 68 which causes the ECU 20 to open the fail-safe valves 60 and the brake valves 64 and close the simulator valves 66.

Then, the driver operates the position changing switch 68 to cause the ECU 20 to energize the electric actuator 24 to move the pedal 12. When, the initial position of the pedal 12 is thus changed, as the pedal 12 is moved by the electric actuator 24, the pistons 26 of the master cylinder 16 are moved, applying a corresponding fluid pressure, i.e., displacing a corresponding fluid amount, through the main passages 33 and the brake valves 64 to the pressurization chambers 42 of the motor cylinders 18. The fluid pressure which corresponds to the movement of the pistons 26 returns through the auxiliary passages 56 to the reservoir tank 52.

When the brake-by-wire system is on, the pedal simulators 13 apply a reactive force to the pedal 12. Therefore, the stroke vs. stepping force characteristics of the pedal 12 reflect the characteristics of the cylinder mechanisms 11 serving as the pedal simulators 13. The cylinder mechanisms 11 are required to have characteristics that are stable and free of time-dependent changes and also have substantially the same characteristics for the same type of vehicles on which the brake apparatus 10 is mounted. At the same time, it is important that the cylinder mechanisms 11 have nonlinear stroke vs. stepping force characteristics such that the pedal operating torque (stepping-resistant rigidity) is smaller when the pedal 12 starts being depressed and greater as the pedal is progressively depressed, thereby giving the driver a natural operational feeling in operating the pedal 12.

Figure 2:
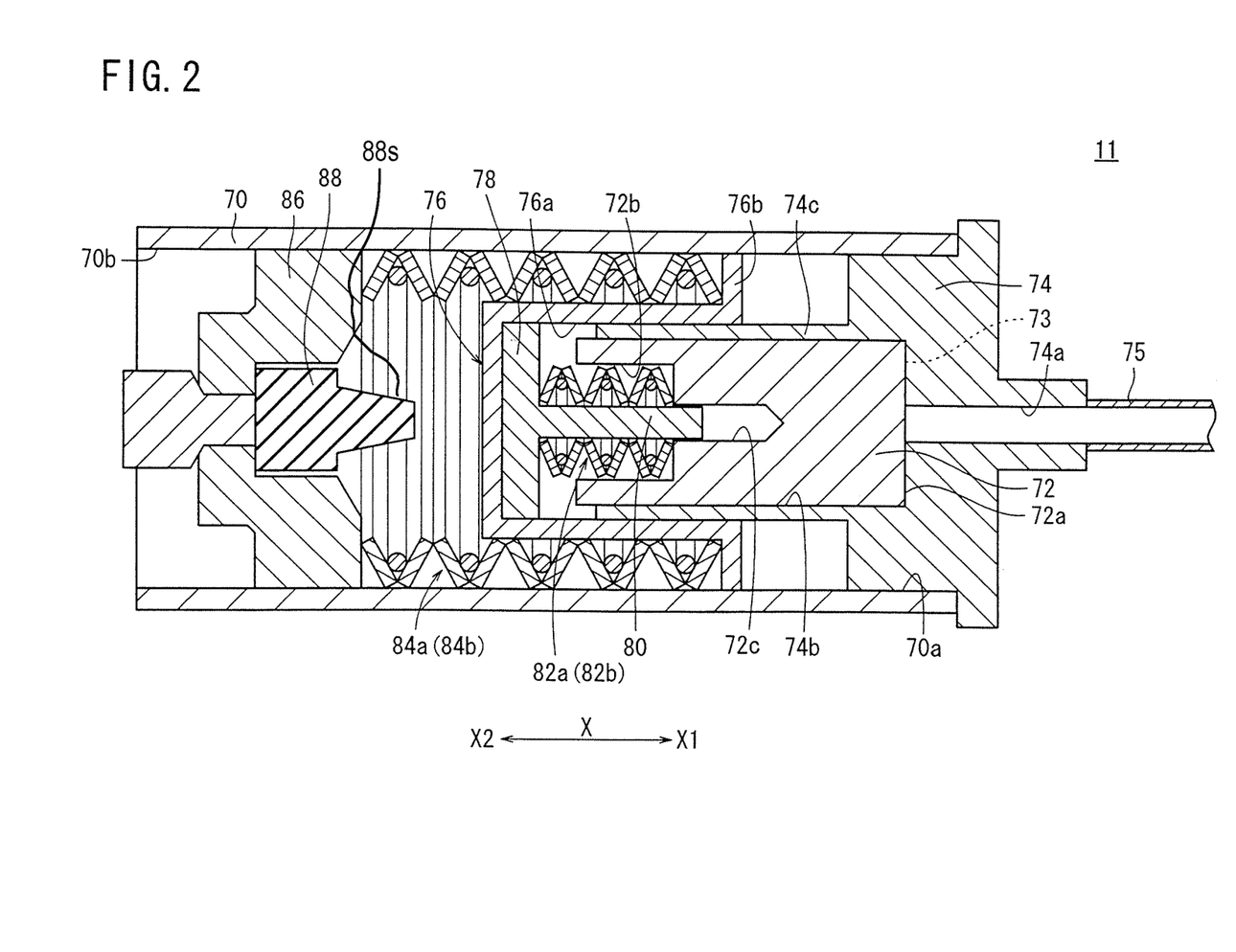
FIG. 2 is an axial cross-sectional view of the cylinder mechanism according to the embodiment of the present invention.

The cylinder mechanisms 11 according to the present embodiment will be described below with reference to FIGS. 2 through 8. Since the two cylinder mechanisms 11 are identical to each other, one of them will be described in detail. FIG. 2 is an axial cross-sectional view of the cylinder mechanism 11 according to the present embodiment of the present invention.

As shown in FIG. 2, the cylinder mechanism 11 includes a hollow cylindrical housing 70 and a piston 72 slidably held in the housing 70. The housing 70 has an open end 70a which is open in the direction indicated by the arrow X1, the open end 70a being closed by a plug (lid member) 74 fitted therein. The plug 74 has an axial through hole 74a defined therein in the directions indicated by the arrow X. The through hole 74a is open toward (communicates with) a hole 74b defined in the plug 74 in the direction indicated by the arrow X2, the hole 74b being larger in diameter than the through hole 74a. The piston 72 is slidably inserted in the hole 74b for axial sliding movement in the directions indicated by the arrow X. Therefore, the hole 74b serves as a cylinder for allowing the piston 72 to slide axially back and forth therein. When a working fluid, e.g., the brake fluid of the brake apparatus 10, is introduced from a passage 75 connected to the outer end face of the plug 74 into the through hole 74a, the fluid pressure of the working fluid is transmitted to a tip end face (acting face) 72a of the piston 72 which faces the through hole 74a. Under the fluid pressure of the working fluid acting through the through hole 74a, the piston 72 is retracted in the direction indicated by the arrow X2. Alternatively, the piston 72 is advanced in the direction indicated by the arrow X1 under the bias of first and second spring assemblies 82a, 84a to be described later. At any rate, a fluid chamber 73 supplied with the working fluid is defined between the tip end face 72a and the plug 74 (see FIG. 7A).

The piston 72 has a recess 72b of a relatively large diameter defined in the other end face thereof and opening in the direction indicated by the arrow X2, and a recess 72c defined in the bottom of the recess 72b and having a diameter smaller than the recess 72b.

The plug 74 includes a sleeve 74c projecting axially in the direction indicated by the arrow X2. The hole 74b in which the piston 72 is held is defined by the inner circumferential surface of the sleeve 74c. The sleeve 74c has an outer circumferential surface slidably held in a recess 76a defined in a transmitter 76 which divides the interior space of the housing 70 in the directions indicated by the arrow X. The transmitter 76 comprises a bottomed hollow cylinder defining the recess 76a therein which extends toward its bottom in the direction indicated by the arrow X2. The transmitter 76 also has a flange 76b extending radially outwardly from the edge of the open end of the recess 76a.

A disk-shaped support member 78 is seated on the bottom of the recess 76a of the transmitter 76 and includes a support shank (support rod) 80 projecting centrally axially toward the piston 72 in the direction indicated by the arrow X1. Between the support shank 80 and the recess 72b of the piston 72, there are held a first spring assembly 82a for urging the piston 72 in the direction indicated by the arrow X1.

A second spring assembly 84a is disposed on the side of the flange 76b in the direction indicated by the arrow X2 for urging the transmitter 76 in the direction indicated by the arrow X1. The second spring assembly 84a has opposite axial ends held respectively by a plug (lid member) 86 which closes another open end 70b of the housing 70 which is open in the direction indicated by the arrow X2, and the flange 76b of the transmitter 76. The second spring assembly 84a is radially held by the housing 70 and the transmitter 76. According to the present embodiment, the spring constant of the second spring assembly 84a is higher than the spring constant of the first spring assembly 82a. A damper (rubber stopper member) 88 is centrally fitted in the plug 86 for preventing the transmitter 76 from producing undue noise or being damaged when the transmitter 76 is displaced greatly in the direction indicated by the arrow X2 and then collides against the plug 86. As shown in FIG. 2, the damper 88 includes a step portion 88s for contacting the transmitter 76. The step portion 88s has a tapered shape with a width gradually increasing from a piston side toward an open end side thereof.

Figure 3A:
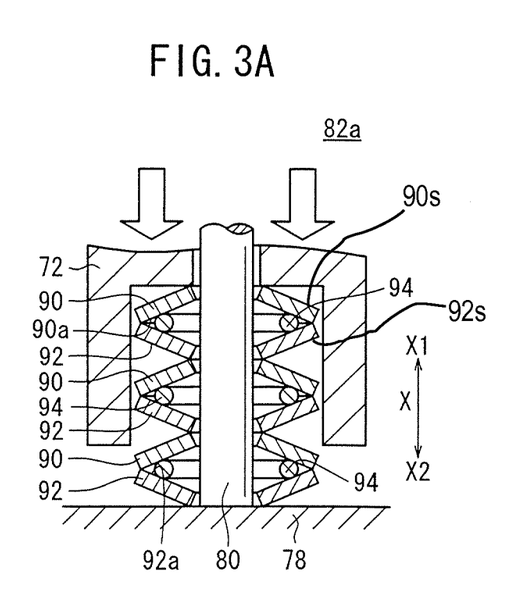
FIG. 3A is a cross-sectional view of a first spring assembly of the cylinder mechanism shown in FIG. 2.
Figure 3B:
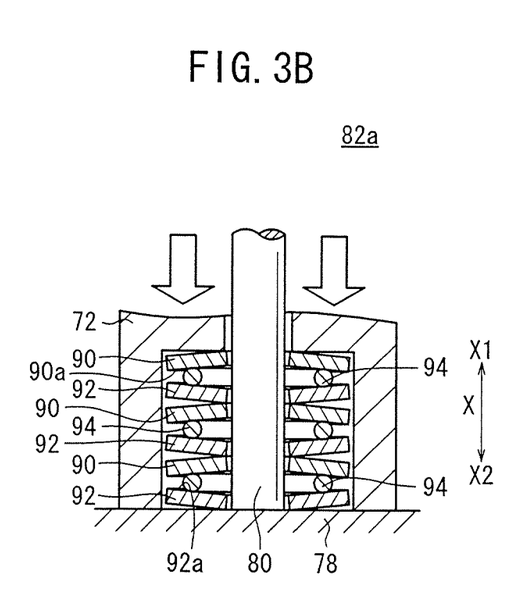
FIG. 3B is a cross-sectional view of the first spring assembly shown in FIG. 3A which is compressed.
Figure 4:
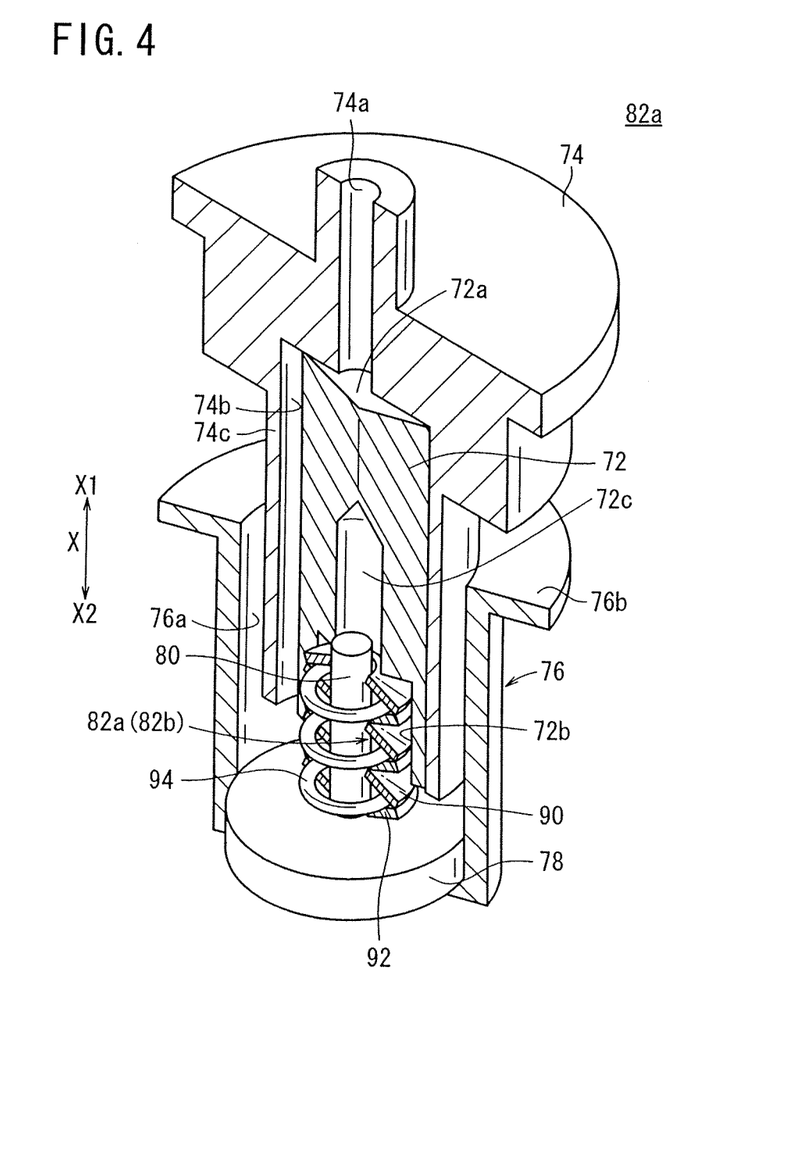
FIG. 4 is a perspective view, partly in cross section, of the first spring assembly of the cylinder mechanism shown in FIG. 2.

Structural details of the first and second spring assemblies 82a, 84a for urging the piston 72 will be described below with reference to FIGS. 3A, 3B, and 4. FIG. 3A is a cross-sectional view of the first spring assembly 82a. FIG. 3B is a cross-sectional view of the first spring assembly 82a shown in FIG. 3A which is compressed. FIG. 4 is a perspective view, partly in cross section, of the first spring assembly 82a. The first spring assembly 82a and the second spring assembly 84a are basically similar to each other in structure except for their inside and outside diameters, spring constants, and the manner in which they are held in position. Therefore, only the first spring assembly 82a will be described in specific detail below, and the second spring assembly 84a will not be described in specific detail below.

As shown in FIGS. 3A and 4, the first spring assembly 82a (or the second spring assembly 84a) comprises a plurality of alternately successive disc springs 90, 92 each of a frustoconical shape having open upper and bottom ends. The larger-diameter bottom ends 90s, 92s of the disc springs 90, 92, respectively, may also be referred to as outer skirt portions, since the frustoconical shape of the spring resembles a skirt. The disc springs 90, 92 have their bottom ends facing each other and are disposed around the support shank 80 (the disc springs 90, 92 of the second spring assembly 84a are disposed around the transmitter 76). Specifically, the disc springs 90 have their frustoconical shapes oriented upwardly, and the other disc springs 92 have their frustoconical shapes oriented downwardly, i.e., in a direction reverse to the disc springs 90. The disc springs 90, 92 are provided in a plurality of sets (three sets in the present embodiment). The disc springs 90 and the disc springs 92 are identical to each other in shape and spring constant, but are oriented differently from each other.

Rings (circular members) 94 disposed around the support shank 80 are provided within the disc springs 90, 92 in the sets whose bottom ends face each other. The rings 94 are doughnut-shaped and have outer arcuate circumferential surfaces (curved surfaces) held against inner slanted surfaces 90a, 92a of the disc springs 90, 92. Insofar as the rings 94 have arcuate surfaces held against the inner slanted surfaces 90a, 92a, the rings 94 may have a circular cross section, an elliptical cross section, or a rectangular cross section whose corners are curved.

As shown in FIG. 3B, when the first spring assembly 82a is compressed by the piston 72 which is pushed under a fluid pressure, the disc springs 90, 92 in the sets are caused to flex axially about the points of contact between the inner slanted surfaces 90a, 92a and the outer arcuate circumferential surfaces of the rings 94. Since the disc springs 90, 92 in each of the sets are held against the outer arcuate circumferential surfaces of the corresponding ring 94, the disc springs 90, 92 are positioned concentrically to each other and held to each other in a diametrical direction perpendicular to the axial direction thereof. The disc springs 90, 92 in each of the sets are thus prevented from being moved or shifted in the diametrical direction relatively to each other and kept concentrically to each other. Accordingly, even when the first spring assembly 82a is repeatedly expanded and compressed, it is prevented from changing its characteristics each time it is expanded and compressed and hence provides desired stable spring characteristics. Stated otherwise, the rings 94 function as a means for preventing the disc springs 90, 92 in each of the sets from being moved or shifted in the diametrical direction perpendicular to the axial direction thereof (a motion preventing means or a shift preventing means).

Figure 5:
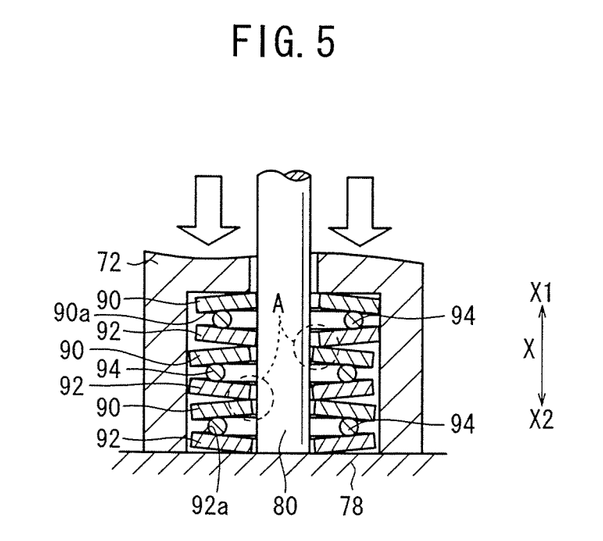
FIG. 5 is a cross-sectional view showing the manner in which sets of disc springs are displaced relatively to each other in the first spring assembly shown in FIG. 3A.

In the first spring assembly 82a (the second spring assembly 84a) with the rings 94 included therein, though the disc springs 90, 92 in each set are prevented by the ring 94 from being moved or shifted in the diametrical direction relatively to each other, the sets of the disc springs 90, 92 may possibly be slightly shifted with respect to each other. Specifically, when the first spring assembly 82a and the second spring assembly 84a are compressed, the rings 94 disposed in the respective sets are slightly moved diametrically. For example, as shown in FIG. 5, the disc spring 92 of one of the sets and the disc spring 90 of another set held in contact therewith may possibly be shifted as indicated by A.

Figure 6A:
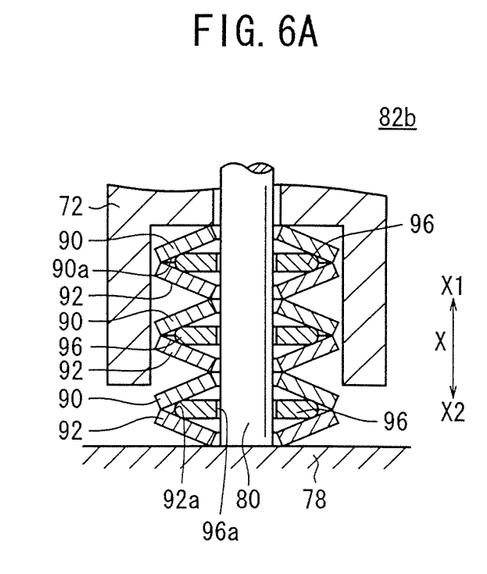
FIG. 6A is a cross-sectional view of a first spring assembly of a modification of the cylinder mechanism shown in FIG. 3A.
Figure 6B:
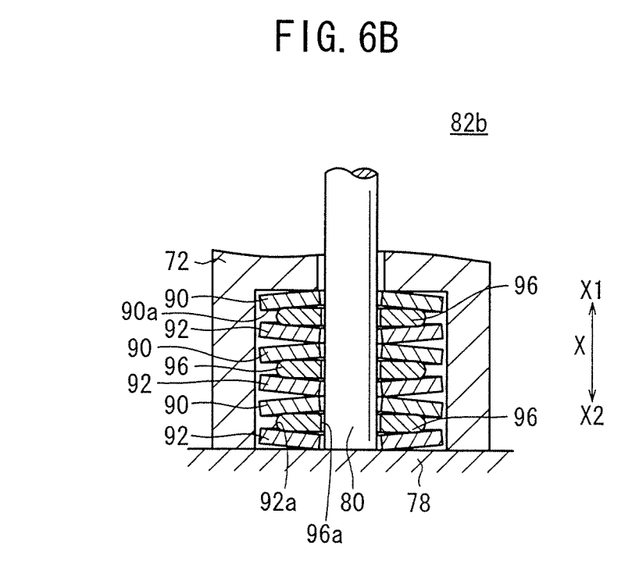
FIG. 6B is a cross-sectional view of the first spring assembly shown in FIG. 6A which is compressed.

FIGS. 6A and 6B show one solution to the above problem according to a modification of the cylinder mechanism 11. As shown in FIGS. 6A and 6B, the cylinder mechanism 11 includes a first spring assembly 82b (a second spring assembly 84b) which employs flat rings (circular members) 96 in place of the rings 94 of the first and second spring assemblies 82a, 84a.

The rings 96 of the first spring assembly 82b (the second spring assembly 84b) have inner holes 96a through which the support shank 80 (the transmitter 76) is inserted, the inner holes 96a having a diameter smaller than the inner holes of the rings 94. Therefore, the rings 96 disposed within the disc springs 90, 92 are prevented reliably from being moved or shifted in the diametrical direction perpendicular to the axial direction thereof. In the first spring assembly 82b (the second spring assembly 84b), the rings 96 are effective to reliably prevent the sets of the disc springs 90, 92 from being relatively shifted in the diametrical direction. Even though the first spring assembly 82b (the second spring assembly 84b) comprising a plurality of stacked sets of disc springs 90, 92, is repeatedly expanded and compressed, the first spring assembly 82b (the second spring assembly 84b) provides desired stable spring characteristics.

The inner holes 96a of the rings 96 need to provide a minimum clearance around the support shank 80 (the transmitter 76) which is large enough to allow the rings 96 to move along the support shank 80 (the transmitter 76) when the first spring assembly 82b (the second spring assembly 84b) is expanded and compressed. The rings 96 are not essentially shifted in the diametrical direction, but are allowed by the clearance to move in the diametrical direction by a distance not large enough to adversely affect the spring characteristics of the first spring assembly 82b (the second spring assembly 84b).

Each of the cylinder mechanisms 11 is basically constructed as described above. Operation of the cylinder mechanism 11 will be described below. When the working fluid flows from the passage 75 through the through hole 74a, the fluid pressure of the working fluid is transmitted to the tip end face 72a of the piston 72, which is slidingly retracted in the direction indicated by the arrow X2 against the bias of the first spring assembly 82a (the first spring assembly 82b). As the piston 72 is progressively retracted, the fluid chamber 73 into which the working fluid is introduced is formed between the tip end face 72a and the plug 74 (see FIG. 7A). In the brake apparatus 10, the working fluid is the brake fluid supplied from the master cylinder 16, and the passage 75 corresponds to the passage 46 (see FIG. 1).

Figure 7A:
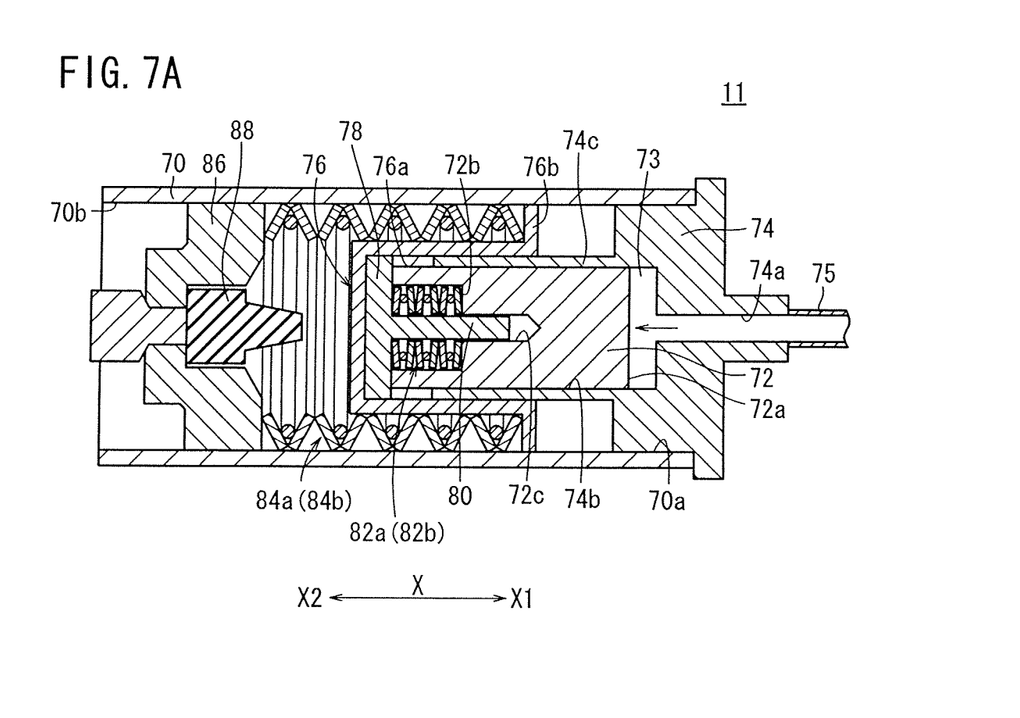
FIG. 7A is a cross-sectional view showing the manner in which a piston is retracted under a fluid pressure, forming a fluid chamber in the cylinder mechanism shown in FIG. 2.
Figure 7B:
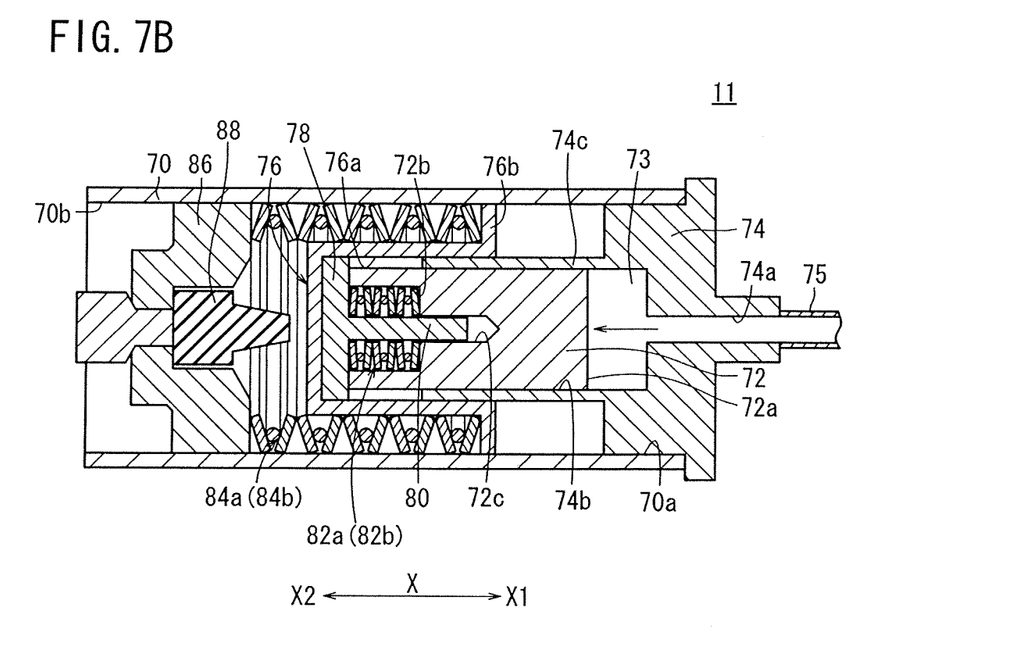
FIG. 7B is a cross-sectional view showing the manner in which the piston is further retracted from the position shown in FIG. 7A.

As the piston 72 is further retracted in the direction indicated by the arrow X2 under the fluid pressure of the working fluid, the piston 72 abuts or bottoms against the support member 78 (see FIG. 7A). Then, the second spring assembly 84a (the second spring assembly 84b) starts to bias the piston 72, and the piston 72 is slidingly retracted in the direction indicated by the arrow X2 against the bias of the second spring assembly 84a (the second spring assembly 84b) (see FIG. 7B).

Figure 8:
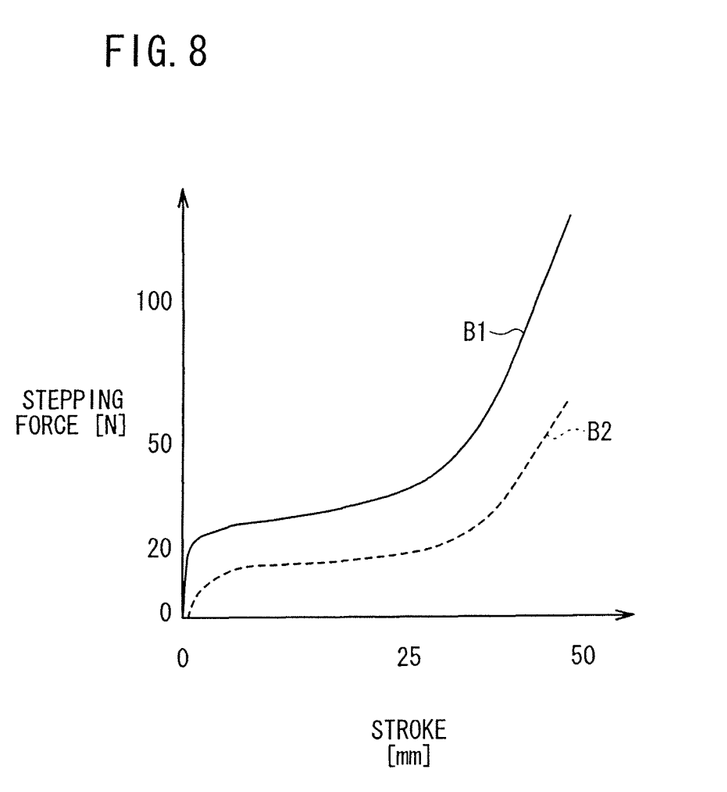
FIG. 8 is a graph showing the relation between the stepping force on the pedal and the piston stroke.

Each of the first spring assembly 82a (the first spring assembly 82b) and the second spring assembly 84a (the second spring assembly 84b) comprises a plurality of stacked disc springs 90, 92 each having nonlinear stroke vs. stepping force characteristics. When the disc springs 90, 92 are caused to flex upon depression of the pedal 12, they generate repulsive forces and also apply the sliding resistance to the piston 72 which progressively increases as the disc springs 90, 92 are more compressed. With the cylinder mechanisms 11 being used as the pedal simulators 13 in the brake apparatus 10, the stepping force (reactive force) on the pedal 12 increases as the depressed stroke of the pedal 12 increases (see the solid-line curve B1 in FIG. 8). When the pedal 12 is released and returns to its original position, the sliding resistance applied by the disc springs 90, 92 decreases as they are more expanded. Upon return of the pedal 12, therefore, the stroke vs. stepping force characteristics of the disc springs 90, 92 exhibit hysteresis (see the broken-line curve b2 in FIG. 8). Accordingly, the pedal simulators 13 in the form of the cylinder mechanisms 11 have optimum nonlinear stroke vs. stepping force characteristics as shown in FIG. 8, thereby giving the driver a natural operational feeling in operating the pedal 12.

Each of the cylinder mechanisms 11 includes, in addition to the first spring assembly 82a (82b), the second spring assembly 84a (84b) having a spring constant greater than the first spring assembly 82a (82b). Since the piston 72 is biased in two stages by these two spring assemblies having different spring constants, the stroke vs. stepping force characteristics of the cylinder mechanism 11 are made suitable for the pedal 12.

In the cylinder mechanisms 11, the disc springs 90, 92 in each set have bottom ends (upper ends) facing each other and held against each other. Since the disc springs 90, 92 are not oriented in the same direction in their stack, the upper end of one of the disc springs 90, 92 is not embedded in the bottom end of an adjacent one of the disc springs 90, 92. Therefore, the first spring assembly 82a (the first spring assembly 82b) and the second spring assembly 84a (the second spring assembly 84b) provide a sufficient stroke with a reduced number of disc springs 90, 92, and can be manufactured at a reduced cost.

The rings 96 shown in FIGS. 6A and 6B are more effective than the rings 94 shown in FIGS. 3A and 3B to prevent the disc springs 90, 92 from being shifted diametrically. The rings 94 can also be effectively used in the case where each spring assembly comprises only one set of disc springs 90, 92 and hence is free from a diametrical shift between sets of disc springs 90, 92, and also in some conditions in which the cylinder mechanism 11 is used.

In the brake apparatus 10 incorporating the pedal simulators 13 in the form of the cylinder mechanisms 11 according to the present invention, the reactive forces generated by the pedal simulators 13 so as to act on the pedal 12 may be corrected by the electric actuator 24 based on the stepping force that is detected by the pedal operation information detector 22, thereby providing more effective stroke vs. stepping force characteristics for the pedal 12.

The cylinder mechanisms 11 according to the present invention are not limited to being used as the pedal simulators 13, and the brake apparatus 10 is not limited to the structure shown in FIG. 1.

Although certain preferred embodiments of the present invention have been shown and described in detail, it should be understood that various changes and modifications may be made therein without departing from the scope of the appended claims.

What is claimed is:

1. A pedal simulator comprising a cylinder mechanism for absorbing a fluid pressure generated in a pressurization chamber of a master cylinder by operating a brake pedal, wherein the cylinder mechanism comprises:
   a housing;
   a piston slidably held in the housing and defining a fluid chamber for introducing a working fluid thereinto a plurality of spring members for urging the piston toward the fluid chamber; and
   a plurality of disc spring members disposed inside of the housing proximate an end of the piston opposite the fluid chamber, said disc spring members provided for urging the piston toward the fluid chamber, wherein at least two of said disc spring members have respective outer edges facing toward each other and contacting one another in an uncompressed configuration thereof, and
   wherein the housing has an open end formed therein on an opposite side of the housing from the piston; and further comprising a lid member which covers the open end of the housing and is composed of a member separate and distinct from the housing, and wherein the lid member is provided with a damper made of a rubber member, wherein the damper comprises a step portion having a tapered shape with a width gradually increasing from a piston side toward an open end side thereof, wherein the housing has a hollow cylindrical bore formed therein, wherein the piston has a first cylindrical recess formed therein having a first inner diameter, and a second cylindrical recess formed therein which communicates with the first recess and has a second inner diameter which is smaller than the first inner diameter,
   the pedal simulator further comprising:
   a substantially cylindrical transmitter slidably disposed in the bore of the housing and having a hollow recess formed therein, and
   a support member seated inside of the recess of the transmitter, the support member comprising a disk-shaped base portion and a support rod attached to the base portion and projecting axially toward the piston, the support rod extending through holes formed in the disc spring members and configured to fit inside of the second cylindrical recess of the piston;
   wherein the disc spring members are configured to fit inside of the first cylindrical recess of the piston.

2. The pedal simulator of claim 1, wherein said disc spring members are components of a first spring assembly having a first outer diameter, and further comprising a second spring assembly comprising a second plurality of disc spring members having a second outer diameter which is larger than the first outer diameter.

3. The pedal simulator according to claim 1, further comprising a substantially circular alignment member disposed between said disc spring members having respective outer skirt portions facing toward each other.

4. The pedal simulator according to claim 1, wherein the housing comprises a plug disposed at the first end of the housing and which has an axial through hole formed therein to receive hydraulic fluid, the plug comprising a base portion which has part of the fluid chamber therein, and a cylindrical sleeve intergrally formed with the base portion, the sleeve configured to fit inside of the hollow recess of the transmitter and to slidably receive the piston therein.

5. A pedal simulator comprising a cylinder mechanism for absorbing a fluid pressure generated in a pressurization chamber of a master cylinder by operating a brake pedal, wherein the cylinder mechanism comprises:
   a housing;
   a piston slidably held in a first end of the housing and defining a fluid chamber for introducing a working fluid thereinto; and
   a plurality of spring members for urging the piston toward the fluid chamber;
   wherein the housing has an open end formed therein on an opposite side of the housing from the piston; and
      further comprising a lid member which covers the open end of the housing and is composed of a member separate and distinct from the housing, and wherein the lid member is provided with a damper made of a rubber member, wherein the damper comprises a step portion having a tapered shape with a width gradually increasing from a piston side toward an open end side thereof, wherein the housing has a hollow cylindrical bore formed therein, and further comprising a plug disposed in the first end of the housing and comprising a base portion which has an axial through hole formed therein to receive hydraulic fluid, and a cylindrical sleeve intergrally formed with the base portion, the sleeve configured to slidably receive the piston therein.

6. The pedal simulator according to claim 5, further comprising a plurality of disc spring members disposed inside of the housing proximate an end of the piston opposite the fluid chamber, said disc spring members provided for urging the piston toward the fluid chamber, wherein at least two of said disc spring members have respective outer edges facing toward each other and contacting one another in an uncompressed configuration thereof.

7. The pedal simulator of claim 6, wherein said disc spring members are components of a first spring assembly having a first outer diameter, and further comprising a second spring assembly comprising a second plurality of disc spring members having a second outer diameter which is larger than the first outer diameter.

8. The pedal simulator according to claim 6, further comprising a substantially circular alignment member disposed between said disc spring members having respective outer skirt portions facing toward each other.

9. A pedal simulator comprising a cylinder mechanism for absorbing a fluid pressure generated in a pressurization chamber of a master cylinder by operating a brake pedal, wherein the cylinder mechanism comprises:
- a housing;
- a piston slidably held in the housing proximate a first end thereof, the piston comprising a face defining one side of a fluid chamber for introducing a working fluid thereinto wherein the piston has a first cylindrical recess formed therein having a first inner diameter, and a second cylindrical recess formed therein which communicates with the first recess and has a second inner diameter which is smaller than the first inner diameter;
- a plurality of pairs of disc spring members disposed inside of the housing proximate an end of the piston opposite the face, said disc spring members provided for urging the piston toward the fluid chamber, wherein each pair of said disc spring members have respective outer edges facing toward each other and contacting one another in an uncompressed configuration thereof,
- a substantially cylindrical transmitter slidably disposed in the bore of the housing and having a hollow recess formed therein, and
- a support member seated inside of the recess of the transmitter, the support member comprising a disk-shaped base portion and a support rod attached to the base portion and projecting axially toward the piston, the support rod extending through holes formed in the disc spring members and configured to fit inside of the second cylindrical recess of the piston;

wherein the housing has a hollow cylindrical bore formed therein and has an open end formed therein on an opposite side of the housing from the piston; and further comprising a lid member which covers the open end of the housing and is composed of a member separate and distinct from the housing, and wherein the lid member is provided with a damper made of a rubber member;

and wherein the disc spring members are configured to fit inside of the first cylindrical recess of the piston.

10. The pedal simulator according to claim 9, wherein the damper comprises a step portion having a tapered shape with a width gradually increasing from a piston side toward an open end side thereof.

11. The pedal simulator of claim 9, wherein said disc spring members are components of a first spring assembly having a first outer diameter, and further comprising a second spring assembly comprising a second plurality of disc spring members having a second outer diameter which is larger than the first outer diameter.

12. The pedal simulator according to claim 9, further comprising a substantially circular alignment member disposed between said disc spring members having respective outer skirt portions facing toward each other in each pair of said disc spring members.

13. The pedal simulator according to claim 9, wherein the housing comprises a plug disposed at the first end of the housing and which has an axial through hole formed therein to receive hydraulic fluid, the plug comprising a base portion which has part of the fluid chamber therein, and a cylindrical sleeve intergrally formed with the base portion, the sleeve configured to fit inside of the hollow recess of the transmitter and to slidably receive the piston therein.

14. The pedal simulator of claim 9, wherein said disc spring members are components of a first spring assembly having a first outer diameter, and further comprising a second spring assembly comprising a second plurality of disc spring members having a second outer diameter which is larger than the first outer diameter.

* * * * *